US011125457B1

(12) United States Patent
Alfano et al.

(10) Patent No.: US 11,125,457 B1
(45) Date of Patent: Sep. 21, 2021

(54) REFRIGERANT LEAK SENSOR AND MITIGATION DEVICE AND METHODS

(71) Applicant: Emerson Climate Technologies, Inc., Sidney, OH (US)

(72) Inventors: David A. Alfano, Sidney, OH (US); Stuart K. Morgan, West Chester, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/930,993

(22) Filed: Jul. 16, 2020

(51) Int. Cl.
| | |
|---|---|
| *F24F 11/36* | (2018.01) |
| *F24F 11/52* | (2018.01) |
| *F24F 11/56* | (2018.01) |
| *F24F 11/77* | (2018.01) |

(52) U.S. Cl.
CPC ............ *F24F 11/36* (2018.01); *F24F 11/52* (2018.01); *F24F 11/56* (2018.01); *F24F 11/77* (2018.01)

(58) Field of Classification Search
CPC .. F24F 11/32; F24F 11/36; F24F 11/77; F24F 11/56; F24F 11/52
See application file for complete search history.

(56) References Cited

U.S. PATENT DOCUMENTS

| | | | | |
|---|---|---|---|---|
| 2,001,704 A | * | 5/1935 | Bulkeley | F24F 11/30 165/229 |
| 4,437,868 A | * | 3/1984 | Kuhlman | F24F 7/013 454/341 |
| 5,259,201 A | * | 11/1993 | Sakai | F25C 1/12 62/135 |
| 6,110,038 A | * | 8/2000 | Stern | F24F 11/77 454/343 |

(Continued)

FOREIGN PATENT DOCUMENTS

| | | |
|---|---|---|
| EP | 3569944 A1 | 11/2019 |
| EP | 3607250 A1 | 2/2020 |

(Continued)

OTHER PUBLICATIONS

Chillgard® RT Refrigerant Leak Detector, MSA—The Safety Company, ID 07-2016-MC, Jan. 2016.
MVR-SC Refrigerant Leak Monitor, Bacharach®, MKTG00151, Rev 0.

*Primary Examiner* — Nelson J Nieves
(74) *Attorney, Agent, or Firm* — Harness, Dickey & Pierce, P.L.C.

(57) ABSTRACT

A system for detecting and mitigating a refrigerant leak includes a temperature control device configured to transmit control signals to a component controller and a blower configured to circulate air. The system includes a leak mitigation controller electrically coupled to the temperature control device and the component controller. The leak (Continued)

mitigation controller directs incoming power to the temperature control device. The leak mitigation controller includes a sensor configured to measure a refrigerant concentration and a relay configured to selectively: (i) connect the temperature control device to the incoming power or (ii) connect the blower to the incoming power. The leak mitigation controller is configured to measure the refrigerant concentration with the sensor and, in response to the measured refrigerant concentration exceeding a threshold, actuate the relay to connect the blower to the incoming power.

20 Claims, 9 Drawing Sheets

(56) References Cited

U.S. PATENT DOCUMENTS

| | | | | |
|---|---|---|---|---|
| 6,204,769 | B1* | 3/2001 | Arai | B60L 3/0046 |
| | | | | 340/632 |
| 6,536,225 | B1* | 3/2003 | Yajima | F24F 1/02 |
| | | | | 62/407 |
| 6,644,047 | B2 | 11/2003 | Taira et al. | |
| 6,772,598 | B1 | 8/2004 | Rinehart | |
| 7,114,343 | B2* | 10/2006 | Kates | G01K 13/00 |
| | | | | 62/126 |
| 7,696,891 | B2* | 4/2010 | Whitney | A62C 99/00 |
| | | | | 340/628 |
| 9,353,979 | B2 | 5/2016 | Morimoto et al. | |
| 9,625,195 | B2 | 4/2017 | Hiraki et al. | |
| 10,488,065 | B2 | 11/2019 | Chen et al. | |
| 10,514,176 | B2 | 12/2019 | Weinert | |
| 10,551,081 | B1* | 2/2020 | Miller-Russell | F24F 11/32 |
| 10,731,884 | B2* | 8/2020 | Blanton | F24F 11/36 |
| 2001/0044161 | A1* | 11/2001 | Komiyama | F24F 3/161 |
| | | | | 438/14 |
| 2002/0011915 | A1* | 1/2002 | Niino | H01H 37/5436 |
| | | | | 337/53 |
| 2010/0163635 | A1* | 7/2010 | Ye | F24F 11/36 |
| | | | | 236/94 |
| 2010/0206869 | A1* | 8/2010 | Nelson | F24H 9/2007 |
| | | | | 219/494 |
| 2011/0160918 | A1* | 6/2011 | McMasters | F25B 45/00 |
| | | | | 700/282 |
| 2012/0090383 | A1* | 4/2012 | Lopez | G01M 3/228 |
| | | | | 73/40.7 |
| 2012/0292006 | A1* | 11/2012 | Yamashita | F24F 3/06 |
| | | | | 165/200 |
| 2013/0213068 | A1 | 8/2013 | Goel et al. | |
| 2015/0047379 | A1* | 2/2015 | Honda | F25D 17/02 |
| | | | | 62/125 |
| 2015/0184874 | A1* | 7/2015 | Chu | F25B 49/022 |
| | | | | 62/126 |
| 2016/0178229 | A1 | 6/2016 | Chen et al. | |
| 2016/0245566 | A1* | 8/2016 | Hiraki | F25B 49/005 |
| 2017/0292725 | A1* | 10/2017 | Conley | G05B 19/048 |
| 2017/0343227 | A1* | 11/2017 | Mowris | F24F 11/0001 |
| 2018/0045424 | A1* | 2/2018 | Yajima | F24F 11/30 |
| 2019/0086111 | A1* | 3/2019 | Yamamoto | F24F 11/74 |
| 2019/0170385 | A1* | 6/2019 | Maddox | F24F 7/007 |
| 2019/0195542 | A1* | 6/2019 | Hansen | F25B 45/00 |
| 2019/0331377 | A1* | 10/2019 | Matsuda | F25B 49/02 |
| 2019/0390873 | A1* | 12/2019 | Suzuki | F28F 1/00 |
| 2020/0049384 | A1* | 2/2020 | Asanuma | F25B 49/005 |
| 2020/0124305 | A1* | 4/2020 | Goel | F24F 11/52 |
| 2020/0132321 | A1* | 4/2020 | Blanton | F24F 11/77 |
| 2020/0225653 | A1* | 7/2020 | Lamont | F24F 11/36 |
| 2020/0248919 | A1* | 8/2020 | Green | G05B 23/027 |
| 2020/0318840 | A1* | 10/2020 | Wada | F25B 49/02 |

FOREIGN PATENT DOCUMENTS

| | | |
|---|---|---|
| WO | WO-2018187450 A1 | 10/2018 |
| WO | WO-2020021661 A1 | 1/2020 |

\* cited by examiner

REFRIGERANT LEAK SENSOR AND MITIGATION DEVICE AND METHODS

FIELD

The present disclosure relates to a heating, ventilation, and air conditioning (HVAC) system and more particularly to detection and mitigation systems of an HVAC system

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most commonly used industrial gases contribute to the worldwide buildup of greenhouse gases in Earth's atmosphere, accelerating the rate of global warming. Worldwide there has been an ongoing push to limit the use of refrigerants with high global warming potential.

Even though A1 refrigerants (nontoxic and not flammable) have traditionally been used in HVAC and refrigeration systems, A2L refrigerants (nontoxic and partially flammable) are replacing A1 refrigerants in commercial and residential buildings due to the reduced impact on global warming. While A2L refrigerants are only partially flammable due to reduced propagation, A2L refrigerants still pose a combustion risk.

SUMMARY

A system for detecting and mitigating a refrigerant leak includes a temperature control device configured to transmit control signals to a component controller and a blower configured to circulate air. The system includes a leak mitigation controller electrically coupled to the temperature control device and the component controller. The leak mitigation controller directs incoming power to the temperature control device. The leak mitigation controller includes a sensor configured to measure a refrigerant concentration and a relay configured to selectively: (i) connect the temperature control device to the incoming power or (ii) connect the blower to the incoming power. The leak mitigation controller is configured to measure the refrigerant concentration with the sensor and, in response to the measured refrigerant concentration exceeding a threshold, actuate the relay to connect the blower to the incoming power.

In further aspects, the relay maintains a connection between the temperature control device and the incoming power via the leak mitigation controller until the measured refrigerant concentration exceeds the threshold. In further aspects, the leak mitigation controller is configured to, in response to the measured refrigerant concentration falling below the threshold, operate the blower for a threshold period and control the relay to connect the temperature control device to the incoming power in response to the threshold period elapsing.

In further aspects, the temperature control device is selectively connected to the incoming power in a normally open position by the leak mitigation controller. In further aspects, the blower is connected to the incoming power in a normally closed position, and the sensor de-energizes a coil of the relay in response to the measured refrigerant concentration exceeding the threshold. In further aspects, the relay is at least one of: (i) a single pole double throw relay, (ii) a double pole double throw relay. In further aspects, the relay includes two or more relays or switches.

In further aspects, the system includes a compressor. In further aspects, the component controller is configured to activate the compressor in response to receiving a control signal from the temperature control device indicating a cool request. In further aspects, a refrigerant of the measured refrigerant concentration is not toxic and is flammable. In further aspects, the system includes a remote monitoring device interfaced with the leak mitigation controller. The remote monitoring device is configured to receive the measured refrigerant concentration from the sensor of the leak mitigation controller and store the measured refrigerant concentration with a corresponding time the measured refrigerant concentration was measured.

In further aspects, the remote monitoring device is configured to monitor a frequency of times a coil of the relay is energized and, in response to the frequency of times the coil is energized exceeding a threshold number, generate and transmit an alert to a user device associated with an entity. In further aspects, the remote monitoring device is configured to monitor a blower runtime in response to the measured refrigerant concentration exceeding the threshold and generate and transmit an alert to a user device associated with an entity in response to the blower runtime exceeding a blower runtime threshold.

In further aspects, the remote monitoring device is included in the leak mitigation controller. In further aspects, the remote monitoring device is operated by and included in the temperature control device. In further aspects, the system includes a backup leak mitigation controller in series with the leak mitigation controller. In further aspects, the backup leak mitigation controller is located within a compartment separate from the leak mitigation controller.

A heating, ventilation, refrigeration, and/or air conditioning (HVAC-R) system including the system for detecting and mitigating the refrigerant leak of claim 1.

A method for detecting and mitigating a refrigerant leak including: directing, via a leak mitigation controller, incoming power from a temperature control device to a component controller. The leak mitigation controller includes a sensor and a relay to selectively: (i) connect the temperature control device to the incoming power or (ii) connect a blower to the incoming power, and wherein the blower circulates air. The method includes measuring, via the sensor, a refrigerant concentration and, in response to the measured refrigerant concentration exceeding a threshold, actuating the relay to connect the blower to the incoming power.

In further aspects, the method includes maintaining, using the relay, a connection between the temperature control device and the incoming power via the leak mitigation controller until the measured refrigerant concentration exceeds the threshold. In further aspects, the method includes, in response to the measured refrigerant concentration falling below the threshold, operating the blower for a threshold period and controlling the relay to connect the temperature control device to the incoming power in response to the threshold period elapsing.

In further aspects, the method includes de-energizing a coil of the relay in response to the measured refrigerant concentration exceeding the threshold. In further aspects, the temperature control device is selectively connected to the incoming power in a normally open position by the leak mitigation controller and the blower is connected to the incoming power in a normally closed position. In further aspects, the relay is at least one of: (i) a single pole double throw relay and (ii) a double pole double throw relay.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
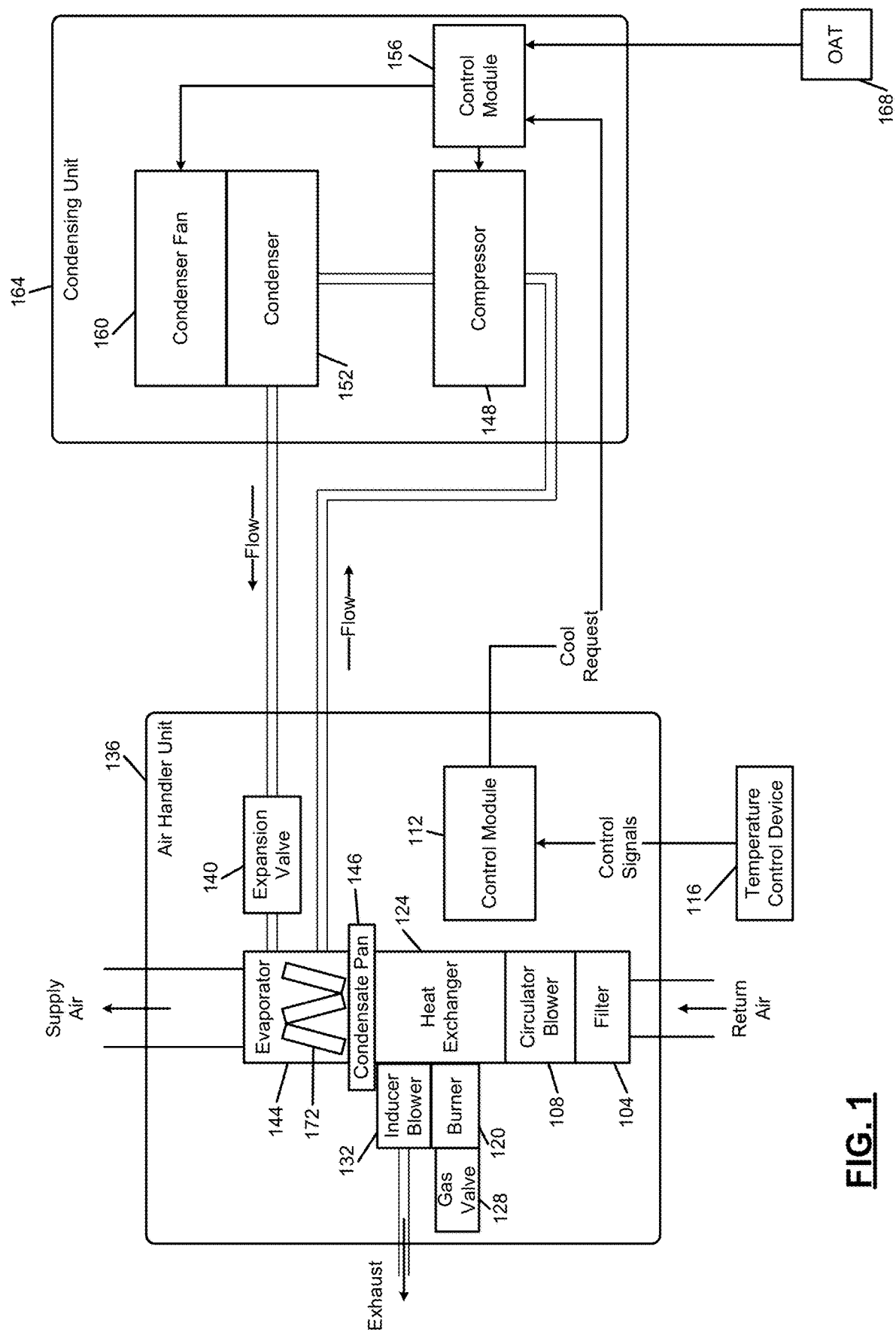
FIG. 1 is a block diagram of an example heating, ventilation, and air conditioning (HVAC) system.

According to the present disclosure, a leak mitigation control module is configured to detect a refrigerant leak of a heating, ventilation, air conditioning, and refrigeration (HVAC-R) system and disable components of the HVAC-R system and activate mitigation components until the leak has been mitigated. The leak mitigation control module energizes or actuates a relay to disable system components of the HVAC system from power and force a fan or blower of the HVAC system to turn on (by directly connecting the blower to power) until a concentration of the refrigerant has fallen below a threshold.

The leak mitigation control module includes a leak sensor to detect the concentration of the refrigerant in a particular area. To detect a refrigerant leak, the leak sensor is placed in an area or location including an evaporator coil of the HVAC system. The leak sensor detects a concentration or percentage volume of refrigerant within the evaporator compartment of the HVAC system. Therefore, the leak sensor may be calibrated based on the size or volume of the compartment including the evaporator coil.

The leak sensor of the leak mitigation control module detects a refrigerant leak in response to the refrigerant concentration in the evaporator compartment exceeding a threshold, for example, 25% of the Lower Flammability Limit (LFL). Then, the relay of the leak mitigation control module is de-energized to disable power from HVAC system components by disconnecting power to a temperature control device, such as a thermostat, and/or control module and directly connect the incoming power to the blower (and/or other mitigation devices), forcing the blower to activate. As the leak mitigation control module is also directly connected to power, the leak sensor continues to determine the concentration of refrigerant in the evaporator compartment. To maintain safe operating conditions, the relay is energized when the HVAC system powers on and the relay is de-energized in response to the refrigerant concentration exceeding the threshold. For example, the described configuration fails safe if the HVAC system loses power.

Once the refrigerant concentration falls below the threshold, the leak mitigation control module continues to operate the blower for a threshold period, for example, five minutes. Upon the threshold period elapsing, the relay of the leak mitigation control module is energized, deactivating the blower and returning power to the temperature control device and/or control module. Since conventionally the control module powers the HVAC system components through a connection to the transformer via the temperature control device the leak mitigation control module is connected in series on the power connection between the temperature control device and control module to be able to interrupt the power connection.

The leak sensor may be configured to detect particular types of refrigerant. While other types of refrigerant sensors may be used by the leak mitigation control module, the leak sensor may be configured to detect A2L refrigerant. In various implementations, the leak mitigation control module senses other types of flammable refrigerant and performs the mitigation described above. The leak mitigation control module may also operate to only detect, monitor, and communicate a leak, for example, if the leak sensor detects leaks of non-flammable refrigerant, such as A1 refrigerant. In an example implementation, the leak mitigation control module may sense more than one type of refrigerant. The leak mitigation control module may also include additional sensors as well. For instance, the leak mitigation control module may include a temperature and a humidity sensor, which may assist in calibrating the leak sensor output.

In various implementations, the leak mitigation control module directly connects the blower to power to operate the blower at the highest capacity. In other implementations, the blower may operate at lower capacities. Additionally, while the relay is shown as a single pole double throw (SPDT) relay, other relays may be used, such as a double pole double throw (DPDT) relay, multiple SPDT relays, etc. In various implementations, the leak mitigation control module may operate to disconnect or disable some HVAC system components but not all.

The leak mitigation control module is electrically coupled between the temperature control module and the control module, such as a furnace control board or an air handler board, of the HVAC system to control the power connection between the temperature control device and the HVAC system control module. Under normal operation, the HVAC system control module receives control signals from the temperature control device to instruct actuation of HVAC system components. When the leak mitigation control module detects an unacceptable level of refrigerant, the leak mitigation control module disconnects the power connection, often referred to as the R or RC wire, between the temperature control device and the HVAC system control module, preventing the temperature control device from completing the control circuit for HVAC system components, such as a compressor, from operating, thereby inhibiting the operation of the HVAC system components.

In various implementations, the leak mitigation control module may transmit an indication to the temperature control device or a remote monitoring device that the HVAC system is operating normally, or a refrigerant leak was detected immediately prior to disabling HVAC system components and activating the blower. The indication may be stored in the remote monitoring device to monitor a frequency and magnitude of refrigerant leaks. Additionally, or alternatively, the temperature control device may generate a notification for the homeowner or entity associated with the HVAC system indicating that a refrigerant leak occurred. Similarly, the leak mitigation control module may transmit an indication to the temperature control device or the remote monitoring device that the refrigerant leak was mitigated upon the relay reconnecting power to the temperature control device and/or control module. The mitigation indication may be stored in a memory of the remote monitoring device, including an elapsed time between leak and mitigation, and the magnitude of refrigerant leaks, as well as transmitted to the homeowner or entity associated with the HVAC system.

The leak mitigation control module is easily incorporated into existing HVAC systems as it does not require any changes to the present control module or schema. Instead, the leak mitigation control module is simply added on to the HVAC system, slightly altering connections between the temperature control device, HVAC system control module, and blower. While the present disclosure described the leak mitigation control module being included in an HVAC system, the leak mitigation control module may be used in a refrigeration unit or other systems that use refrigerant.

As A2L, partially flammable, refrigerants make their way into commercial and residential buildings, standards committees are working towards creating a set of rules and regulations to govern how to detect and mitigate an A2L refrigerant leak. The leak mitigation control module has the ability to be powered by a standard 24 volt (V) AC HVAC transformer and can lockout all HVAC equipment in the event of a leak while turning on the mitigation devices, including the blower, at the same time.

Overall, the leak mitigation control module operates by selectively cutting the power feed to the temperature control device or other HVAC controllers, such as the HVAC system control module, in the event of a refrigerant leak and reroutes that power directly to the intended mitigation device(s), in this case, the blower. This locks out non-mitigation devices in a simple and cost-effective manner. In various implementations, two single pole double throw relays may be implemented in the leak mitigation control module to selectively lock out particular HVAC components.

Block Diagrams

FIG. 1 is a block diagram of an HVAC system. In this particular example, a forced air system with a gas furnace is shown. Return air is pulled from a building through a filter 104 by a circulator blower 108. The circulator blower 108, also referred to as a fan, is controlled by a control module 112. The control module 112 receives signals from a temperature control device 116, such as a thermostat. For example, the temperature control device 116 may include one or more setpoint temperatures specified by the user. As mentioned previously, the temperature control device 116 may include a temperature sensor and a humidity sensor.

The temperature control device 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The temperature control device 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

One ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the HVAC system control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

As shown in FIG. 1, the HVAC system includes a split air conditioning system. Refrigerant is circulated through a compressor 148, a condenser 152, the expansion valve 140, and an evaporator coil 172 of the evaporator 144. The evaporator 144 is a compartment including the evaporator coil 172. The evaporator 144 is placed in series with the supply air so that when cooling is desired, the evaporator coil 172 removes heat from the supply air, thereby cooling the supply air. During cooling, the evaporator coil 172 is circulating refrigerant making the evaporator coil 172 cold (e.g., below the return air temperature), which causes water vapor to condense. This water vapor is collected in the condensate pan 146, which is drained or is pumped out.

A control module 156 receives a cool request from the control module 112 and controls the compressor 148 accordingly. The control module 156 may also control a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the condensing unit 164 may include a 240 volt mains power line and a 24 volt switched control line. The 24 volt control line may correspond to the cool request shown in FIG. 1. The 24 volt control line controls operation of the control module 112 and the control module 156. When the control line indicates that the compressor 148 should be on, the control module 156 operates a set of switches to connect the 240 volt power supply to a motor of the compressor 148 or to connect the motor of the compressor 148 to a drive to operate the compressor 148. In addition, the control module 156 may connect the 240 volt power supply to the condenser fan 160. In various implementations, such as when the condensing unit 164 is located in the ground as part of a geothermal system, the condenser fan 160 may be omitted. The 240 volt mains power supply arrives in two legs, as is common in the U.S., both of the legs connect to the motor of the compressor 148.

While FIG. 1 depicts an AC only unit, other implementations may include heat pump units that would further include an accumulator, reversing valve, auxiliary heat source, and an outdoor expansion device.

When in a heating (heat) mode, the temperature control device 116 generates a heat request when the temperature measured by the temperature sensor is less than a lower temperature limit. When in a cooling (cool) mode, the temperature control device 116 generates a cool request when the temperature measured by the temperature sensor is greater than an upper temperature limit. The upper and lower temperature limits may be set to a setpoint temperature+ and − a threshold amount (e.g., 1, 2, 3, 4, 5 degrees Fahrenheit), respectively. The setpoint temperature may be set to a temperature by default and may be adjusted via receipt of user input. The threshold amount may be set by default and may be adjusted via receipt of user input.

In various implementations, the control module 156 or temperature control device 116, may receive signals from an outdoor air temperature (OAT) sensor 168. The temperature control device 116 may be a WiFi or communicating temperature control device having networking capability. In various implementations, the OAT sensor 168 may be located within an enclosure, shielded from direct sunlight, and/or exposed to an air cavity that is not directly heated by sunlight. Alternatively or additionally, online (including Internet-based via the temperature control device 116) weather data based on the geographical location of the building may be used to determine sun load, OAT, relative humidity, particulate, VOCs, carbon dioxide, etc.

In various implementations, the air handler unit 136 may include a transformer (shown in FIGS. 2-7) connected to an incoming AC power line in order to provide AC power to the control module 112 and the temperature control device 116. For example, the transformer may be a 10-to-1 transformer and therefore provide either a 12V or 24V AC supply depending on whether the air handler unit 136 is operating on nominal 120 volt or nominal 240 volt power. Additionally or alternatively, the transformer may be a 5-to-1 transformer to provide 24V AC supply if the air handler is operating on nominal 120 volt power. In the present implementation, the temperature control device 116 provides 24 VAC power to components of the HVAC system in response to threshold conditions being met.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored.

One or more of these control signals (on the control lines) is also transmitted to the condensing unit 164. In various implementations, the condensing unit 164 may include an ambient temperature sensor that generates temperature data. When the condensing unit 164 is located outdoors, the ambient temperature represents an outside (or outdoor) ambient temperature. The temperature sensor supplying the ambient temperature may be located outside of an enclosure of the condensing unit 164.

Figure 2:
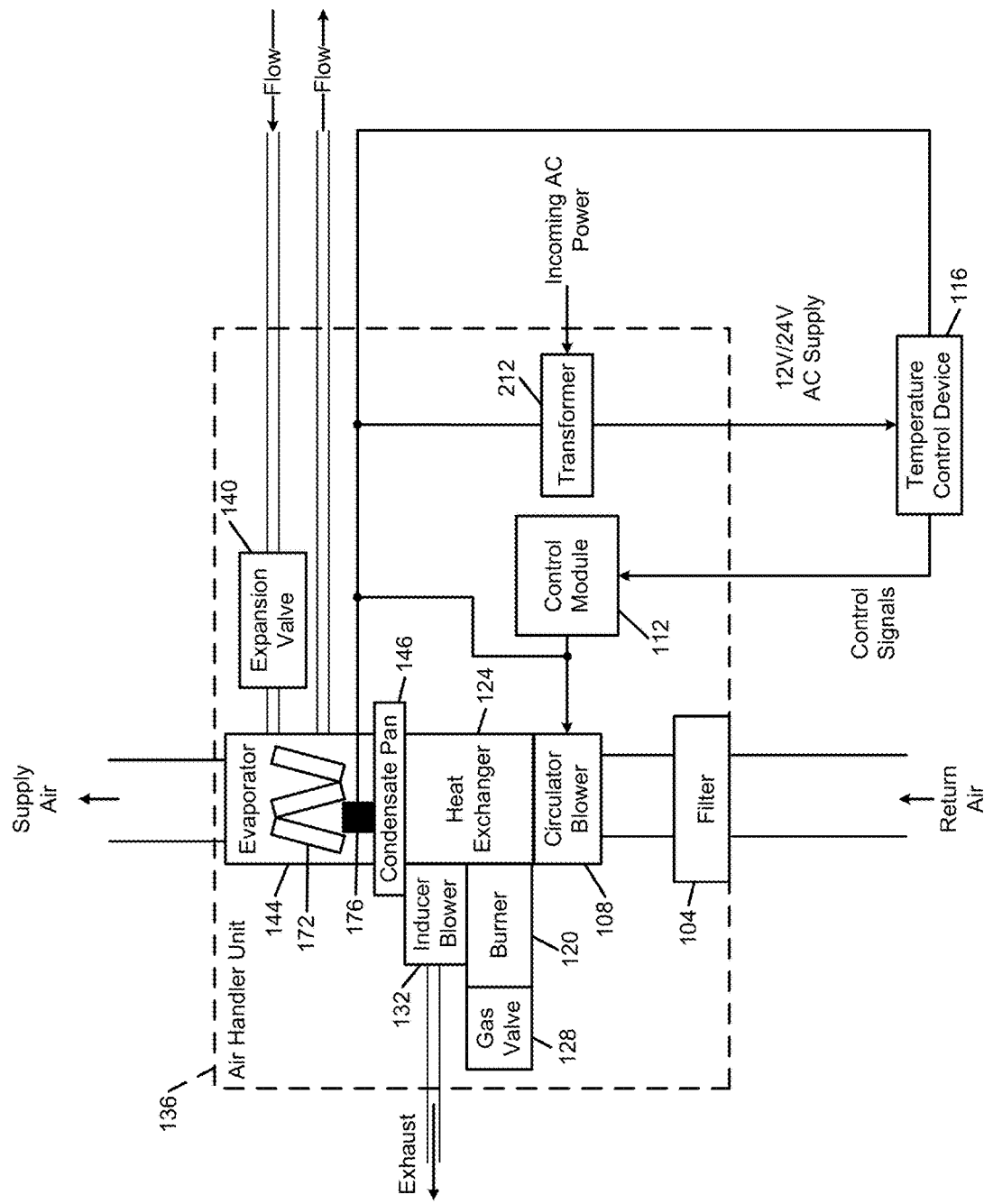
FIG. 2 is a functional block diagram of an upflow air handler unit of an example HVAC system including a leak mitigation control module.

FIG. 2 is a functional block diagram of an upflow air handler unit of an example HVAC system including a leak mitigation control module 176. The air handler unit 136 of FIG. 1 is shown for reference and context. Upflow systems direct return air upward through the air handler unit 136.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure, often referred to as a packaged unit. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2, a transformer 212 can be connected to an AC line in order to provide AC power to the HVAC system control module 112, the leak mitigation control module 176, and the temperature control device 116. For example, the transformer 212 may provide 24V AC power to the HVAC system components, including the control module 112 and temperature control device 116. The control module 112 controls operation in response to signals from the temperature control device 116 received over control lines. The control lines may include a call for cool (cool request), a call for heat (heat request), and a call for fan (fan request). The control lines may include a line corresponding to a state of a reversing valve in heat pump systems.

The leak mitigation control module 176 is located within the evaporator 144 by the evaporator coil 172. The evaporator 144 is a compartment including the evaporator coil 172. The leak mitigation control module 176 includes a leak sensor and a relay, for example, a safety relay. The leak sensor measures a refrigerant concentration within the evaporator 144. The leak sensor measures the concentration of A2L, a nontoxic and partially flammable refrigerant. However, the leak sensor may instead measure a refrigerant that is nontoxic and not flammable refrigerant, such as A1; a refrigerant that is nontoxic and flammable, such as A2; a refrigerant that is nontoxic and highly flammable, such as A3; or similar versions of refrigerants that are toxic. Additionally, the leak mitigation control module 176 may include other sensors to measure parameters such as temperature, relative humidity, or barometric pressure.

The leak sensor measures a refrigerant concentration as a percent of refrigerant to air mix in a known space—here, the evaporator 144. The leak sensor may be calibrated to the particular HVAC system and the size of compartment in which the leak mitigation control module 176 is placed. The leak mitigation control module 176 controls the relay to disconnect power from HVAC system components in response to a percent of refrigerant to air mix within the evaporator 144 exceeding a lower flammability limit (LFL) or a lower explosive limit (LEL) for a given refrigerant. Both limits represent a lower end of a percent concentration of a refrigerant or any flammable gas that can be ignited when mixed with air. For example, the leak sensor of the leak mitigation control module 176 can de-energize the relay or actuate a switch in response to the measured refrigerant exceeding 25% of the LFL for a given refrigerant within the evaporator 144. The relay may be a single pole double throw relay that is de-energized in response to the measured refrigerant exceeding a threshold. The relay is energized under normal operation. However, if the detected LFL exceeds the threshold, the relay is de-energized. Similarly, if power to the air handler unit 136 or control module 112 is cut, the relay is de-energized, so that the system "fails safe" in the event of a power loss to the control module 112 or the HVAC system as a whole.

The leak mitigation control module 176 receives power directly from the transformer 212. In various implementations, the leak mitigation control module 176 receives power directly from the incoming AC power or line voltage (as long as appropriate power circuitry is included in the leak mitigation control module 176). In various implementations, the leak mitigation control module 176 could have power supplied by the HVAC system control module 112, leveraging the onboard power conditioning that most control modules already have. In such an implementation, and assuming the control module 112 supplies 3.3V-12V DC, for example, the leak mitigation control module 176 would no longer need the more extensive power conditioning to convert 24V AC to a usable DC power signal, required by many digital devices. Other embodiments could include an external AC to DC power supply that powers the leak mitigation control module 176 so that extensive power conditioning does not need to be included onboard.

The HVAC system components, including the control module 112, receive power from the transformer 212. The temperature control device 116 controls the operation of HVAC system components using, for example, a set of switches to connect HVAC system components to power via the control module 112. In various implementations, the temperature control device 116 may be battery powered while still regulating the flow of power to the HVAC system components via control signals to the control module 112. The leak mitigation control module 176 connects the power supplied to the temperature control device 116 when the relay of the leak mitigation control module 176 is in a normally closed state. That is, when the refrigerant concentration is below the threshold, the relay of the leak mitigation control module 176 connects the power to the temperature control device 116. In various implementations, the leak mitigation control module 176 may selectively connect and disconnect power from the control module 112 along with or instead of the temperature control device 116.

Therefore, the power from the transformer 212 to the temperature control device 116 to send control signals to the control module 112 to activate and deactivate HVAC system components, such as the burner 120, circulator blower 108, etc., is connected to the temperature control device 116 through the leak mitigation controller relay. Once the leak sensor of the leak mitigation control module 176 measures a refrigerant concentration above the threshold, the relay is de-energized, resulting in a completed circuit on the normally closed terminal of the relay, which connects the power of the transformer 212 (via the temperature control device 116 or directly) to the circulator blower 108, and then an open circuit is created on the normally open terminal of the relay, disconnecting power to the temperature control device 116 and disabling all other HVAC system components.

Therefore, once a leak is detected, the temperature control device 116 is disconnected from power and cannot send control signals to the control module 112 and thus disables the HVAC system components from operation. The power bypasses the temperature control device 116 and is directly fed to the circulator blower 108 to mitigate the refrigerant leak by reducing the refrigerant concentration in the area. The leak mitigation control module 176 is placed based on where a refrigerant leak would occur: at the evaporator coil 172. In various implementations, the leak mitigation control module 176 may be placed in other locations throughout the HVAC system.

Figure 3:
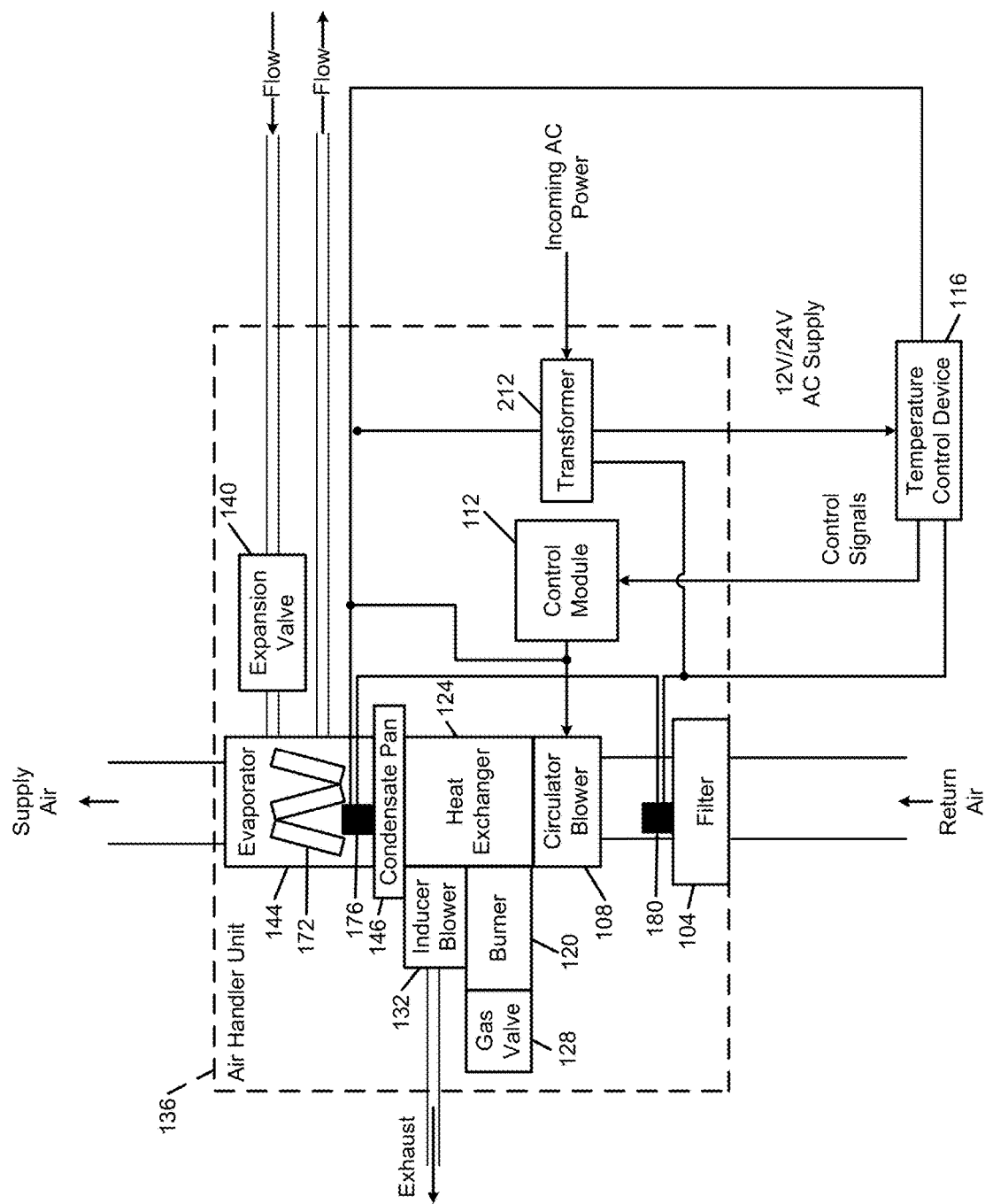
FIG. 3 is a functional block diagram of an upflow air handler unit of an example HVAC system including multiple leak mitigation control modules.

FIG. 3 is a functional block diagram of an upflow air handler unit of an example HVAC system including multiple leak mitigation control modules. The leak mitigation control module 176 of FIG. 2 is shown as well as another leak mitigation control module 180, which are electrically coupled. The second leak mitigation control module 180 is placed at a lower point within the HVAC system, which is another location where a leak may be detected since refrigerant is heavier than air and drops when it leaks from the system. The first leak mitigation control module 176 or the second leak mitigation control module 180 may operate the circulator blower 108 or, if another blower (not shown) is included in the HVAC system, the leak mitigation control module 180 may be configured to connect power to a blower nearest the leak mitigation control module 180. For example, in commercial applications, multiple evaporator coils may be included in a system; therefore, multiple leak mitigation control modules may be included and configured to operate a nearest blower.

Figure 4:
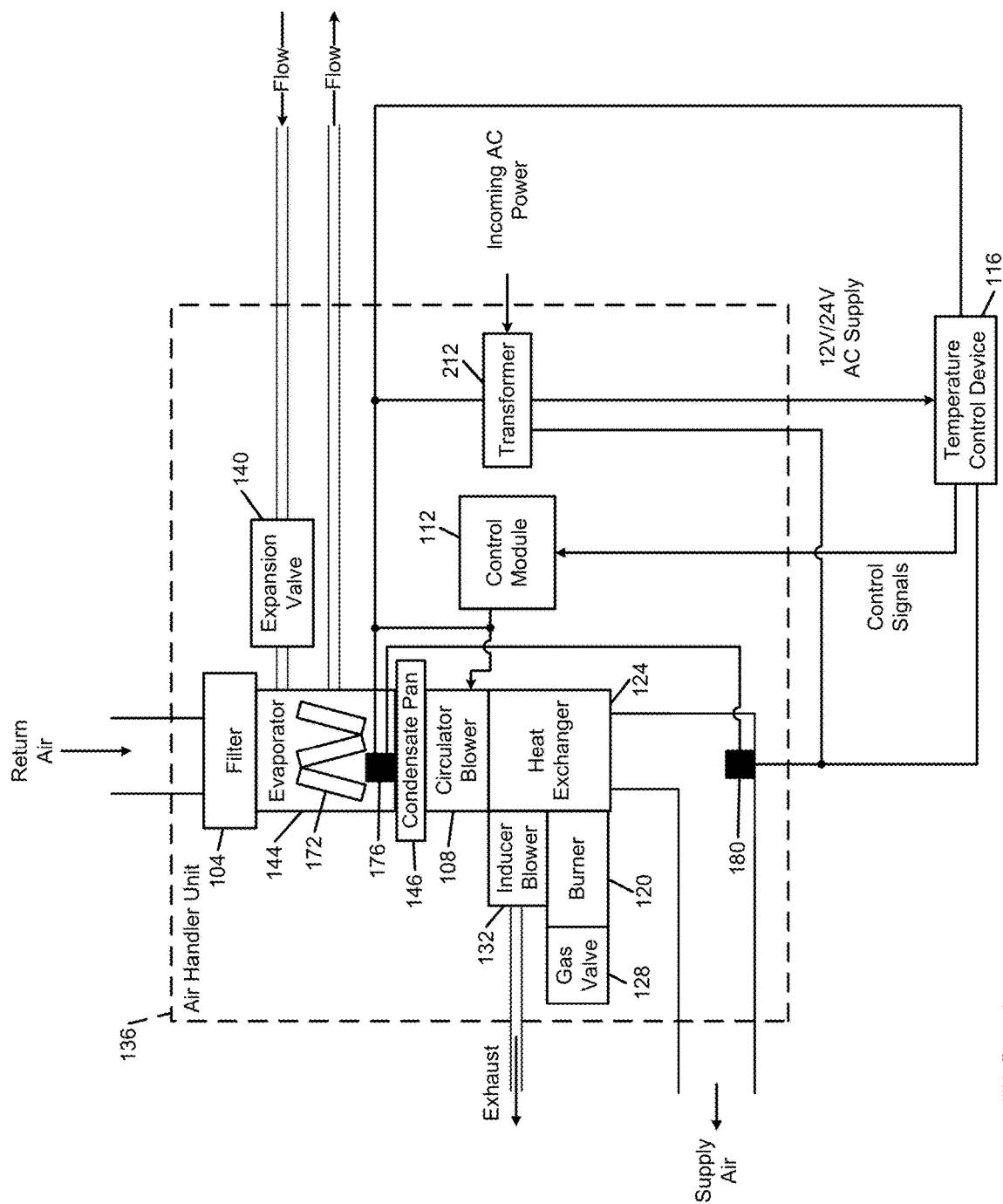
FIG. 4 is a functional block diagram of a downflow air handler unit of an example HVAC system including multiple leak mitigation control modules.

FIG. 4 is a functional block diagram of a downflow air handler unit of an example HVAC system including multiple leak mitigation control modules. The downflow air handler unit operates similar to the upflow air handler units 136 of FIGS. 2 and 3, but is rearranged to draw return air downward. Therefore, in the downflow air handler unit, the leak mitigation control module 180 may be located at a bottom of a vent at the supply air end to detect a refrigerant leak as the refrigerant drops downward. The HVAC system includes the leak mitigation control module 176 within the evaporator 144 to detect a refrigerant leak where the leak occurs. The power wire connecting the leak mitigation control module 176 and the leak mitigation control module 180 are electrically connected between the transformer 212 or temperature control device 116 and the control module 112 may be connected in series. That is, only one of the leak mitigation control modules 176 or 180 measuring a refrigerant concentration above the threshold will result in locking out HVAC system components (by disconnecting power) and forcing the fan on.

Figure 5:
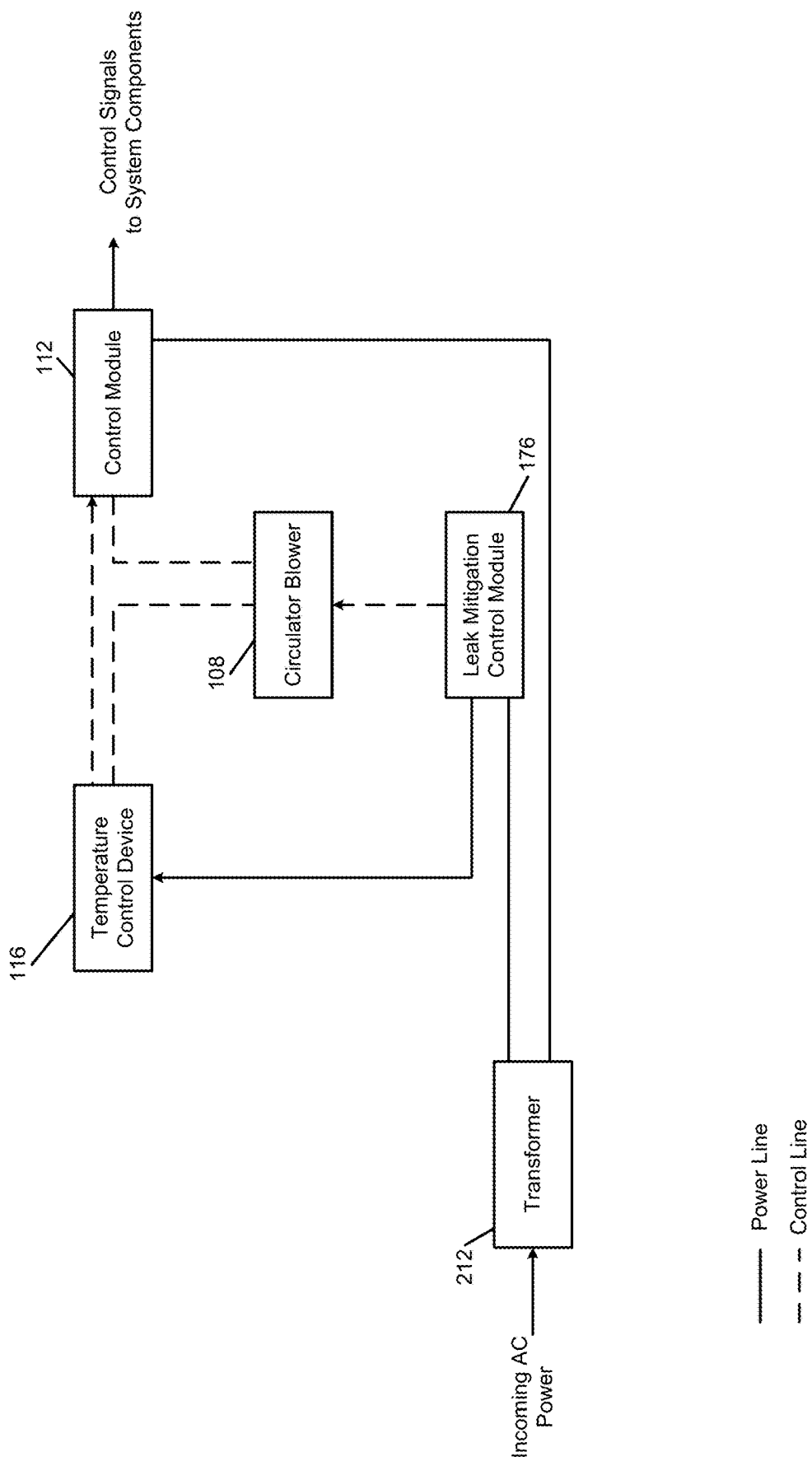
FIG. 5 is a functional block diagram of a leak mitigation control module of an example HVAC system.

FIG. 5 is a functional block diagram of the leak mitigation control module 176 of an example HVAC system. The control module 112 and the leak mitigation control module 176 receive power from the transformer 212, as indicated by the solid connecting power lines. In various implementations, the leak mitigation control module 176 is electrically connected to the circulator blower 108, for example, through a system control circuit, as indicated by the dashed control lines. The leak mitigation control module 176 is also electrically coupled to the temperature control device 116 as indicated by the solid power line.

As long as the leak mitigation control module 176 does not detect a refrigerant concentration above the threshold, the temperature control device 116 continues to transmit control signals to the control module 112, directing the actuation via, for example, a set of switches, to connect HVAC system components to the incoming AC power as directed. However, in response to detecting the refrigerant concentration above the threshold, the leak mitigation control module 176 locks out the power connection from the temperature control device 116 to the transformer 212, preventing the HVAC components from being connected to power, disabling operation. That is, the control module 112 can no longer receive signals from the temperature control device 116 once the leak mitigation control module 176 disconnects the temperature control device 116 from the incoming AC power.

The leak mitigation control module 176 bypasses the temperature control device 116 and directly connects the circulator blower 108 to power provided by the transformer 212 to cause the circulator blower 108 to turn on to reduce the concentration of the refrigerant. The circulator blower 108 is started in response to the leak mitigation control module 176 detecting a refrigerant concentration above the threshold. Once the leak mitigation control module 176 measures a concentration of the refrigerant below the threshold, the leak mitigation control module 176 maintains activation of the circulator blower 108 for a threshold time, for example, five minutes. Upon completion of the threshold time, the control module 176 disables the previously established temperature control device 116 bypass to the circulator blower 108 as well as reconnecting the temperature control device 116 to the transformer 212, thereby returning control of all HVAC components to the temperature control device 116. The leak mitigation control module 176 performs the connecting and disconnecting using a relay. Optionally, in various implementations, the control module 112 and the leak mitigation control module 176 may transmit control signals, for example, indicating when the HVAC system components are disabled or enabled due to a refrigerant leak having been detected.

Figure 6:
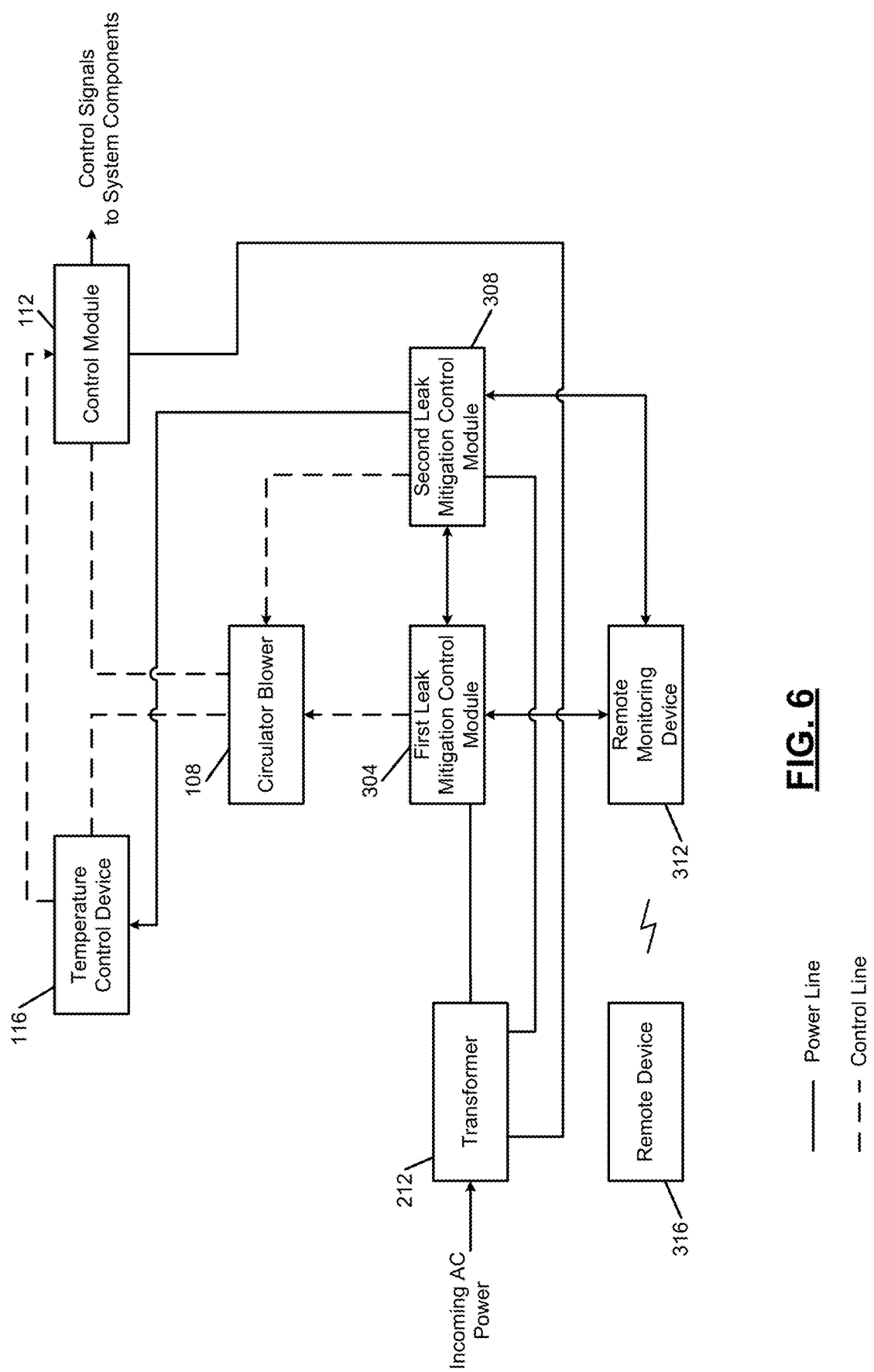
FIG. 6 is a functional block diagram of multiple leak mitigation control modules of an example HVAC system.

FIG. 6 is a functional block diagram of multiple leak mitigation control modules of an example HVAC system. A first leak mitigation control module 304 is electrically coupled to the transformer 212 and a second leak mitigation control module 308. The second leak mitigation control module 308 is electrically coupled to the temperature control device 116 via a power connecting line, as indicated by the solid connecting lines. The first leak mitigation control module 304 and the second leak mitigation control module 308 are connected in series in order to selectively connect the transformer 212 to the temperature control device 116 or circulator blower 108. Both the first leak mitigation control module 304 and the second leak mitigation control module 308 bypass the temperature control device 116 and connect the transformer 212 directly to the circulator blower 108 in response to measuring a refrigerant concentration above the threshold.

As shown in FIGS. 3 and 4, the first leak mitigation control module 304 and the second leak mitigation control module 308 are located in different spaces of the HVAC system. In various implementations, a different circulator blower may be included in the HVAC system and the second leak mitigation control module 308 may selectively connect to the different circulator blower during mitigation.

A remote monitoring device 312 (or a remote control device) may be included and connected to the first leak mitigation control module 304 and the second leak mitigation control module 308. The remote monitoring device 312 may also be included in an implementation with only one leak mitigation control module. In various implementations, the first leak mitigation control module 304 and the second leak mitigation control module 308 may transmit measurements intermittently or in real time to the remote monitoring device 312. The remote monitoring device 312 may include bidirectional communication, monitoring the present refrigerant concentration as well as transmitting commands to the leak sensor or the leak mitigation control module 176 to, for example, calibrate the leak sensor or reset the leak sensor. In various implementations, the remote monitoring device 312 may be included in the temperature control device 116 and/or control module 112.

The first leak mitigation control module 304 and the second leak mitigation control module 308 may also send notifications to the remote monitoring device 312 once the threshold is exceeded and once the leak is mitigated (that is, once the first leak mitigation control module 304 or the second leak mitigation control module 308 reconnects the control module 112 to the transformer 212). The remote monitoring device 312 may also send diagnostic information, such as an indication that the refrigerant sensor is malfunctioning or has reached the end of its life. The remote monitoring device 312 may transmit notifications to a remote device 316, such as to a homeowner or entity, via WiFi, Bluetooth, ZigBee, Z-Wave, Modbus, BACnet, or any other digital or analog communication channel. The remote device 316 may be a computing device or a mobile computing device. Additionally, the remote monitoring device 312 may be in communication with the temperature control device 116 via a wired or wireless connection (not shown) to monitor HVAC system conditions.

As mentioned previously, the remote monitoring device 312 may monitor a frequency and magnitude of refrigerant leaks in order to determine a fault in the HVAC system. In various implementations, the remote monitoring device 312 may generate and transmit an alert to a homeowner or an entity in response to a total number of leaks exceeding a threshold number over a period and their respective magnitude. The remote monitoring device 312 may include a processor, memory, and user interface for analyzing, storing, and displaying HVAC system data.

In various implementations, the remote monitoring device 312 may also monitor a runtime of the blower during mitigation. For example, if the blower has been operating beyond a threshold runtime and the refrigerant concentration has not fallen below the threshold, the remote monitoring device 312 may generate an alert to a homeowner or an entity that the mitigation is not resolving the refrigerant leak. While only two leak mitigation control modules are shown, a plurality of leak mitigation modules may be included throughout an HVAC system to detect any refrigerant leaks at a variety of locations. In various implementations, the leak mitigation control module 176, the first leak mitigation control module 304, and/or the second leak mitigation control module 308 may include the functionality of the remote monitoring device 312 via a processor and associated memory and transceiver included in the leak mitigation control modules.

Figure 7A:
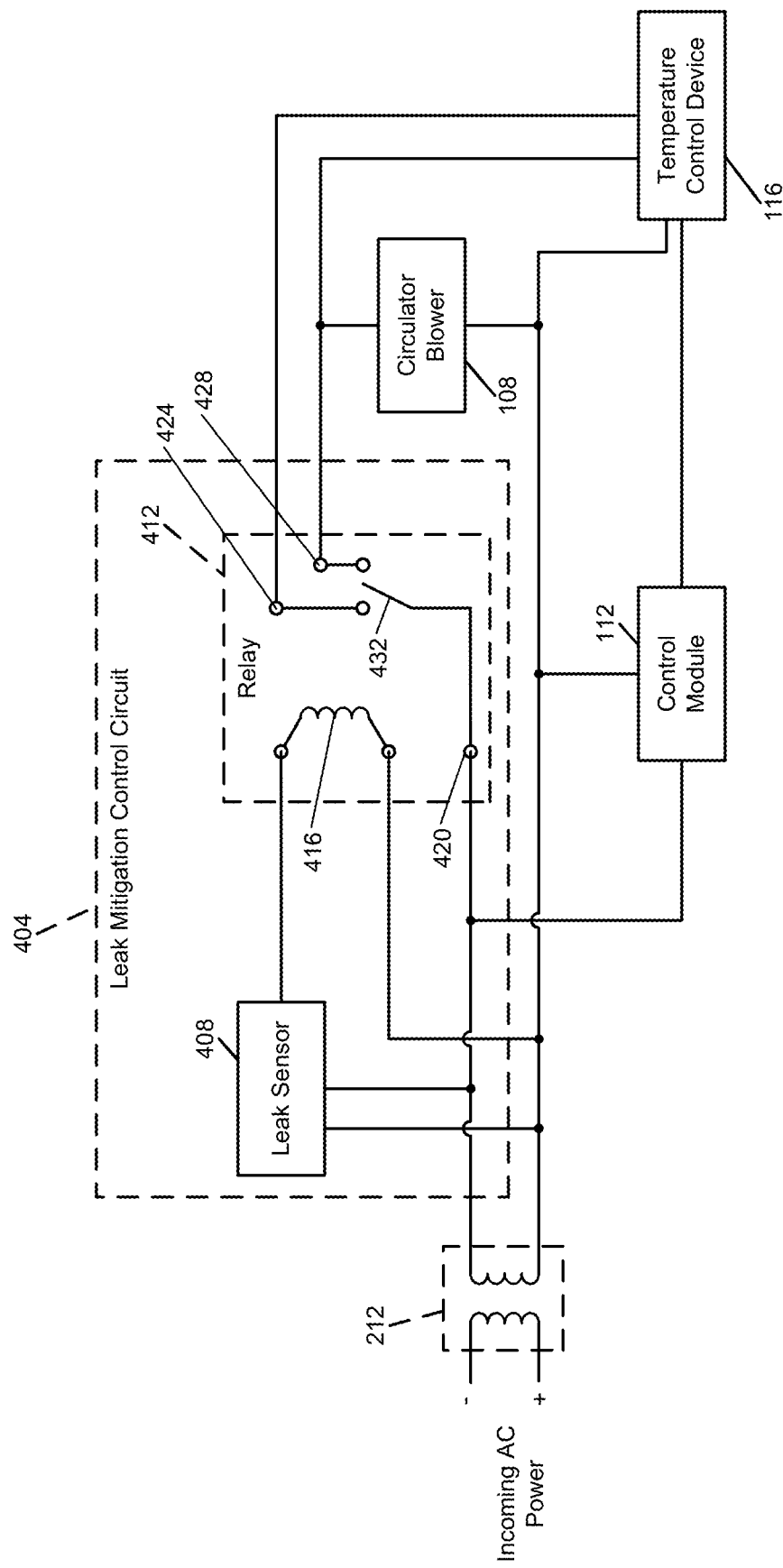
FIGS. 7A and 7B are functional block diagrams of a leak mitigation control circuit within an evaporator of an air handler unit.
Figure 7B:
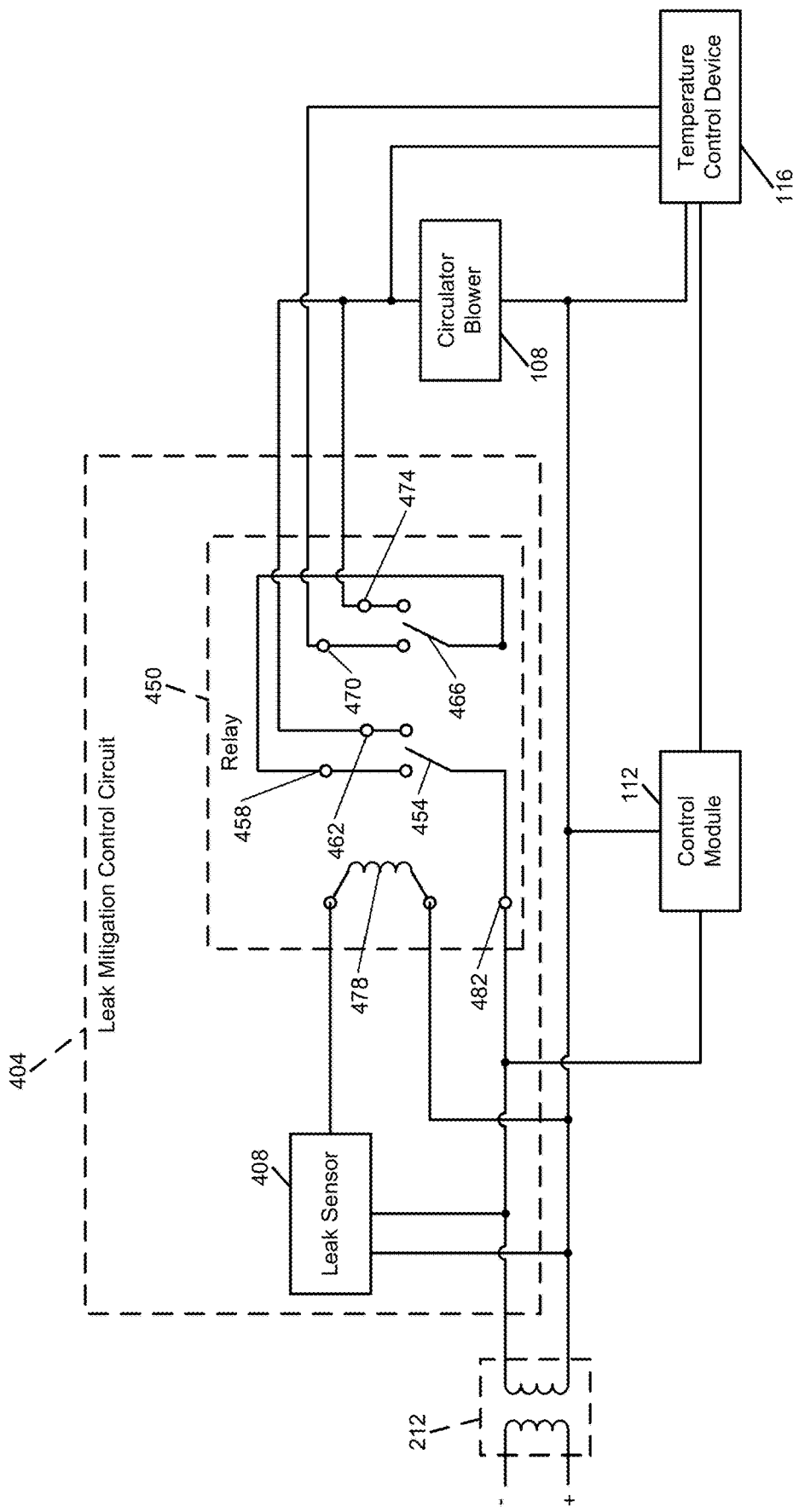

FIGS. 7A and 7B are functional block diagrams of a leak mitigation control circuit 404 within an evaporator of an air handler unit. Referring to FIG. 7A, the leak mitigation control circuit 404 may be implemented as the leak mitigation control modules previously described. The leak mitigation control circuit 404 includes a leak sensor 408 and a relay 412. The leak sensor 408 is connected to the transformer 212 and a first end of a coil 416 of the relay 412. A second end of the coil 416 is connected to a second end of the transformer 212. The coil 416 of the relay 412 is de-energized in response to the leak sensor 408 detecting a refrigerant concentration exceeding the threshold. In various implementations, the leak sensor 408 may be a subassembly of the leak mitigation control circuit 404, including a separate processor, associated memory, etc.

The relays include a common terminal 420, a normally open terminal 424, and a normally closed terminal 428. The common terminal 420 is connected to the first end of the transformer 212 and the control module 112. An arm 432 of the relay 412 connects the common terminal 420 to the normally closed terminal 428 when the coil 416 is not energized (a state when the refrigerant concentration has exceeded the threshold). The arm 432 connects the common terminal to the normally open terminal 424 when the coil 416 is energized (during normal operation while the refrigerant concentration is below the threshold). The normally open terminal 424 is connected to the temperature control device 116. The second end of the transformer 212 is also connected to the temperature control device 116 as well as the circulator blower 108. The transformer 212 is further connected to the control module 112. Therefore, when the arm 432 connects the common terminal 420 and the normally open terminal 424 (a state when the refrigerant concentration is below threshold), the temperature control device 116 is connected to the transformer 212, providing power to the control module 112 and allowing the temperature control device 116 to regulate the flow of power to HVAC system components.

When the arm 432 connects the common terminal 420 to the normally closed terminal 428 (in response to refrigerant concentration exceeding threshold), the transformer 212 powers the circulator blower 108 and disconnects the temperature control device 116 from power, preventing power from operating the control module 112 and HVAC system components.

Referring to FIG. 7B, the leak mitigation control circuit 404 may be the same, except including a double pole double throw (DPDT) relay 450. The DPDT relay 450 includes a first switch 454 with a first normally open terminal 458 and a first normally closed terminal 462. A second switch 466 includes a second normally open terminal 470 and a second normally closed terminal 474. When a DPDT coil 478 is energized (when the HVAC system is on and the refrigerant concentration is below the threshold), the first switch 454 is connected to the first normally open terminal 458 and the second switch 466 is connected to the second normally open terminal 470. This connects a DPDT common terminal 482 to the temperature control device 116. If the refrigerant concentration exceeds the threshold, the DPDT coil 478 is de-energized, the first switch 454 is connected to the first normally closed terminal 462 and the second switch is connected to the second normally closed terminal 474, disabling the HVAC system components and powering on the circulator blower 108. Using the DPDT relay 450 provides a backup since both the first normally closed terminal 462 and the second normally closed terminal 474 connect the power to the circulator blower 108. Further, both the first switch 454 and the second switch 466 need to be connected to the first normally open terminal 258 and the second normally open terminal 470, respectively, to enable the powering of the HVAC system components. Therefore, if one of the contacts accidently fuses shut, the other switch operates as the back up to power on the circulator blower 108 and disable the HVAC components.

Flowchart

Figure 8:
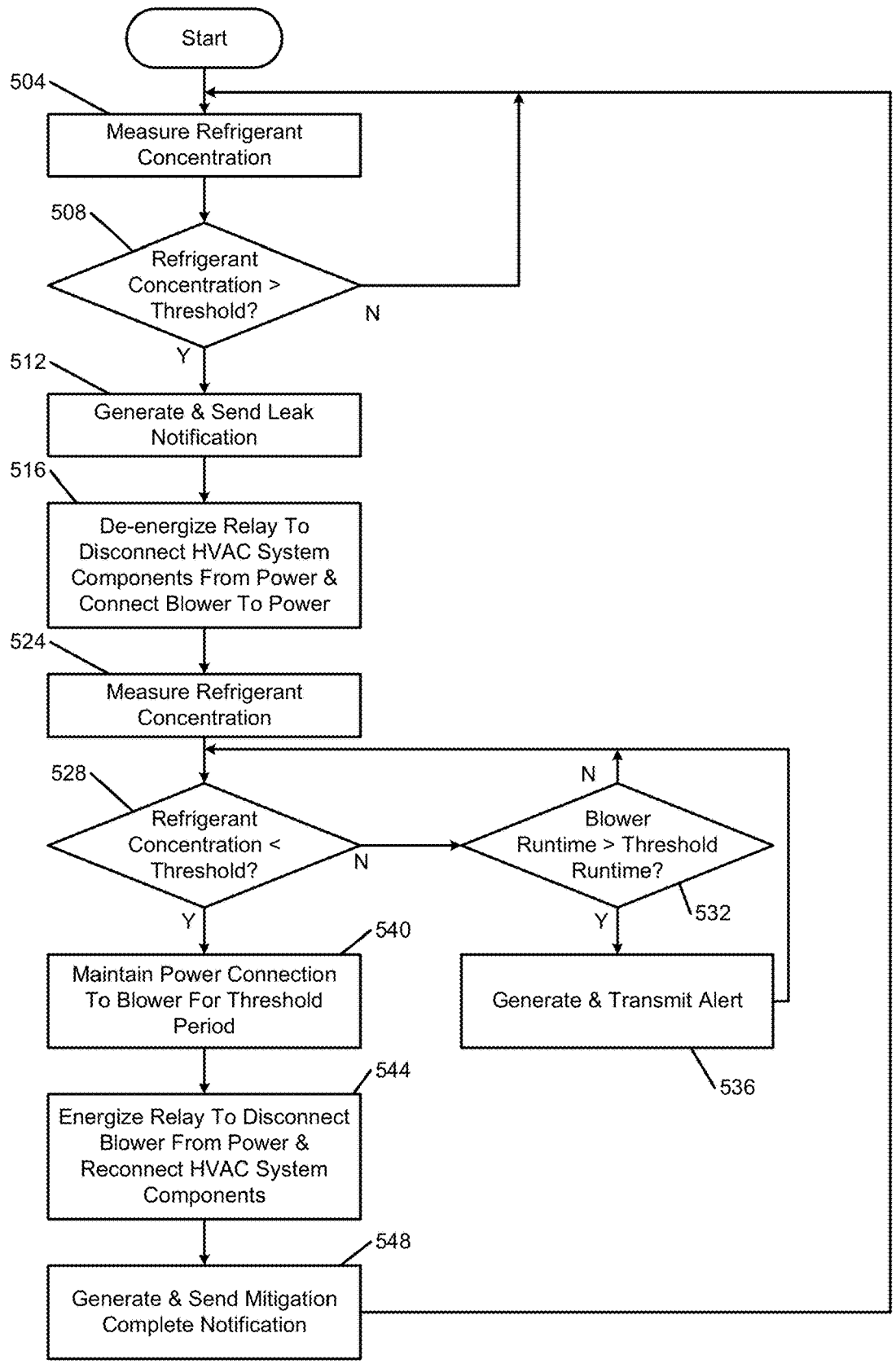
FIG. 8 is a flowchart depicting example operation of an example leak mitigation controller of an HVAC system.

FIG. 8 is a flowchart depicting example operation of an example leak mitigation controller of an HVAC system. Control begins at 504 to measure a refrigerant concentration, for example, via the leak sensor 408 described above. Control proceeds to 508 to determine if the measured refrigerant concentration is above a threshold, for example, 25% of the LFL. If no, control returns to 504. Otherwise, if the measured refrigerant concentration is above the threshold, control continues to 512 to generate and send a leak notification to a homeowner or entity. Then, control proceeds to 516 to de-energize the relay 412 to disconnect HVAC system components from power and connect a blower to power. As described above, the relay 412 may be de-energized to move the arm 432 from a first position (normally open) connecting the temperature control device 116 and other HVAC components to power to a second position (normally closed) connecting the blower to power.

Once the blower is operating, control proceeds to 524 to measure the refrigerant concentration. At 528, control determines whether the refrigerant concentration is below the threshold. If no, control proceeds to 532 to determine if a present blower runtime is greater than a threshold runtime.

That is, control determines if the blower has been operating beyond the threshold runtime, without reducing the refrigerant concentration below the threshold. For example, the threshold runtime may be five minutes. If no, control returns to 528. Otherwise, if the blower has been operating beyond the threshold runtime, control continues to 536. At 536, control generates and transmits an alert indicating the blower has been operating beyond the threshold runtime and the refrigerant concentration is still exceeding the threshold. The alert may be transmitted to a user device of the homeowner or a computing system or mobile device of an entity.

Once the alert is transmitted at 536, control returns to 528. Instead, if the refrigerant concentration is below the threshold at 528, control continues to 540. At 540, control maintains the power connection to the blower for a threshold period. Control proceeds to 544 to re-energize the relay to disconnect the blower from power, reconnecting the temperature control device to power in order to connect the HVAC system components to power. Control proceeds to 548 to generate and transmit a mitigation complete notification to a homeowner or entity. In various implementations, control may exclude the leak and mitigation notifications to the homeowner or entity. Additionally or alternatively, the notifications may be stored locally or in the remote monitoring device 312 described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting and mitigating a refrigerant leak, comprising:
    a temperature controller configured to transmit control signals to a component controller;
    a blower configured to circulate air;
    a leak mitigation controller electrically coupled to the temperature controller, the leak mitigation controller directs incoming power to the temperature controller, and the leak mitigation controller includes:
        a sensor configured to measure a refrigerant concentration;

a relay configured to selectively switch between: (i) connecting the temperature controller to the incoming power and (ii) connecting the blower to the incoming power; and the leak mitigation controller is configured to:
measure the refrigerant concentration with the sensor; and
in response to the measured refrigerant concentration exceeding a threshold, actuate the relay to connect the blower to the incoming power.

2. The system of claim 1 wherein the relay maintains a connection between the temperature controller and the incoming power via the leak mitigation controller until the measured refrigerant concentration exceeds the threshold.

3. The system of claim 1 wherein the leak mitigation controller is configured to:
in response to the measured refrigerant concentration falling below the threshold:
operate the blower for a threshold period and
control the relay to connect the temperature controller to the incoming power in response to the threshold period elapsing.

4. The system of claim 1 wherein:
the temperature controller is selectively connected to the incoming power in a normally open position by the leak mitigation controller,
the blower is connected to the incoming power in a normally closed position, and
the sensor de-energizes a coil of the relay in response to the measured refrigerant concentration exceeding the threshold.

5. The system of claim 1 wherein:
the relay is at least one of: (i) a single pole double throw relay, (ii) a double pole double throw relay.

6. The system of claim 1 wherein the relay includes two or more relays or switches.

7. The system of claim 1 further comprising:
a compressor, wherein the component controller is configured to activate the compressor in response to receiving a control signal from the temperature controller indicating a cool request.

8. The system of claim 1 wherein:
a refrigerant of the measured refrigerant concentration is not toxic and is flammable.

9. The system of claim 1 further comprising:
a remote monitoring device interfaced with the leak mitigation controller, the remote monitoring device is configured to:
receive the measured refrigerant concentration from the sensor of the leak mitigation controller; and
store the measured refrigerant concentration with a corresponding time the measured refrigerant concentration was measured.

10. The system of claim 9 wherein the remote monitoring device is configured to:
monitor a frequency of times a coil of the relay is energized, and
in response to the frequency of times the coil is energized exceeding a threshold number, generate and transmit an alert to a user device associated with an entity.

11. The system of claim 9 wherein the remote monitoring device is configured to:
monitor a blower runtime in response to the measured refrigerant concentration exceeding the threshold, and
generate and transmit an alert to a user device associated with an entity in response to the blower runtime exceeding a blower runtime threshold.

12. The system of claim 9 wherein the remote monitoring device is included in the leak mitigation controller.

13. The system of claim 9 wherein the remote monitoring device is operated by and included in the temperature controller.

14. The system of claim 1 further comprising:
a backup leak mitigation controller in series with the leak mitigation controller, wherein the backup leak mitigation controller is located within a compartment separate from the leak mitigation controller.

15. A heating, ventilation, refrigeration, and/or air conditioning (HVAC-R) system comprising:
the system for detecting and mitigating the refrigerant leak of claim 1.

16. A method for detecting and mitigating a refrigerant leak, comprising:
directing, via a leak mitigation controller, incoming power to a temperature controller, wherein the leak mitigation controller includes:
a sensor, and
a relay to selectively switch between: (i) connecting the temperature controller to the incoming power and (ii) connecting a blower to the incoming power, and wherein the blower circulates air;
measuring, via the sensor, a refrigerant concentration; and
in response to the measured refrigerant concentration exceeding a threshold, actuating the relay to connect the blower to the incoming power.

17. The method of claim 16 further comprising:
maintaining, using the relay, a connection between the temperature controller the incoming power via the leak mitigation controller until the measured refrigerant concentration exceeds the threshold.

18. The method of claim 16 further comprising:
in response to the measured refrigerant concentration falling below the threshold:
operating the blower for a threshold period and
controlling the relay to connect the temperature controller to the incoming power in response to the threshold period elapsing.

19. The method of claim 16 further comprising:
de-energizing a coil of the relay in response to the measured refrigerant concentration exceeding the threshold, wherein:
the temperature controller is selectively connected to the incoming power in a normally open position by the leak mitigation controller, and
the blower is connected to the incoming power in a normally closed position.

20. The method of claim 16 wherein:
the relay is at least one of: (i) a single pole double throw relay and (ii) a double pole double throw relay.

* * * * *